United States Patent [19]
Kelch et al.

[11] Patent Number: 5,444,503
[45] Date of Patent: Aug. 22, 1995

[54] SPECTACLE LENS

[75] Inventors: Gerhard Kelch, Aalen; Hans Lahres; Helmut Wietschorke, both of Aalen-Wasseralfingen, all of Germany

[73] Assignee: Carl-Zeiss-Stiftung, Heidenheim, Germany

[21] Appl. No.: 36,821

[22] Filed: Mar. 25, 1993

[51] Int. Cl.⁶ .................................................. G02C 7/06
[52] U.S. Cl. ..................................................... 351/169
[58] Field of Search .................................. 351/168–172

[56] References Cited

U.S. PATENT DOCUMENTS

| | | | |
|---|---|---|---|
| 3,722,986 | 3/1973 | Tagnon | 351/169 |
| 3,910,691 | 10/1975 | Maitenaz | 351/169 |
| 3,950,082 | 4/1976 | Volk | 351/169 |
| 4,606,622 | 8/1986 | Fueter et al. | 351/169 |
| 5,083,859 | 1/1992 | Jalie | 351/159 |
| 5,137,343 | 8/1992 | Kelch et al. | 351/169 |

FOREIGN PATENT DOCUMENTS

| | | |
|---|---|---|
| 0039497 | 11/1981 | European Pat. Off. . |
| 0039498 | 11/1981 | European Pat. Off. . |
| 2002474 | 7/1970 | Germany . |
| 2044639 | 11/1983 | Germany . |
| 1239620 | 7/1971 | United Kingdom . |
| WO86/01308 | 2/1986 | WIPO . |

OTHER PUBLICATIONS

"Neue progressive Flächen" by G. Guilino et al, DOZ, No. 11, Nov. 20, 1980, pp. 20 to 23.

Primary Examiner—Scott J. Sugarman
Attorney, Agent, or Firm—Walter Ottesen

[57] ABSTRACT

The invention is directed to a spectacle lens having a multifocal surface and a prescription surface. The prescription surface is a general aspheric surface without point and axis symmetry. Of the individual use conditions, at least the dioptric power is considered within an area when determining the geometry of the prescription surface. The prescription surface is provided exclusively for generating the dioptric power in the reference points and additionally for eliminating the increase of imaging errors.

20 Claims, 16 Drawing Sheets

|  |  |
|---|---|
| -.284 | -.297 |
| -.156 -.172 -.187 -.200 | -.211 -.220 -.225 -.226 |
| -.064 -.083 -.100 -.114 -.126 -.137 | -.146 -.153 -.156 -.155 -.148 -.136 |
| -.010 -.030 -.047 -.061 -.072 -.082 -.090 | -.097 -.102 -.104 -.101 -.092 -.077 -.055 |
| .003 -.012 -.025 -.035 -.043 -.050 -.055 | -.060 -.064 -.065 -.062 -.052 -.035 -.010 |
| .031 .009 -.003 -.012 -.019 -.024 -.028 -.031 | -.035 -.038 -.039 -.035 -.025 -.007 .019 .055 |
| .036 .014 .001 -.005 -.009 -.012 -.013 -.015 | -.018 -.021 -.022 -.018 -.006 .009 .037 .074 |
| .041 .020 .005 -.001 -.003 -.004 -.004 -.005 | -.007 -.011 -.012 -.009 .001 .019 .046 .082 |
| .056 .044 .023 .006 0.000 -.001 0.000 0.000 0.000 | -.002 -.006 -.008 -.005 .003 .021 .047 .082 .126 |
| .048 .037 .018 .004 0.000 0.000 .001 .002 .001 | -.001 -.006 -.009 -.007 .001 .017 .042 .075 .118 |
| .021 .007 -.001 -.003 -.001 0.000 .002 .001 | -.002 -.007 -.011 -.011 -.004 .009 .031 .062 |
| .001 -.007 -.010 -.008 -.005 -.002 0.000 0.000 | -.003 -.010 -.015 -.018 -.014 -.004 .013 .041 |
| -.018 -.021 -.020 -.016 -.011 -.007 -.003 -.002 | -.005 -.012 -.019 -.025 -.027 -.023 -.010 .011 |
| -.036 -.033 -.027 -.020 -.014 -.008 -.006 | -.007 -.013 -.022 -.033 -.042 -.047 -.041 |
| -.059 -.053 -.044 -.034 -.024 -.016 -.010 | -.010 -.016 -.027 -.042 -.059 -.072 -.076 |
| -.082 -.068 -.054 -.039 -.026 -.017 | -.015 -.022 -.036 -.055 -.077 -.097 |
| -.079 -.055 -.036 -.024 | -.024 -.034 -.051 -.074 |
| -.031 | -.038 |

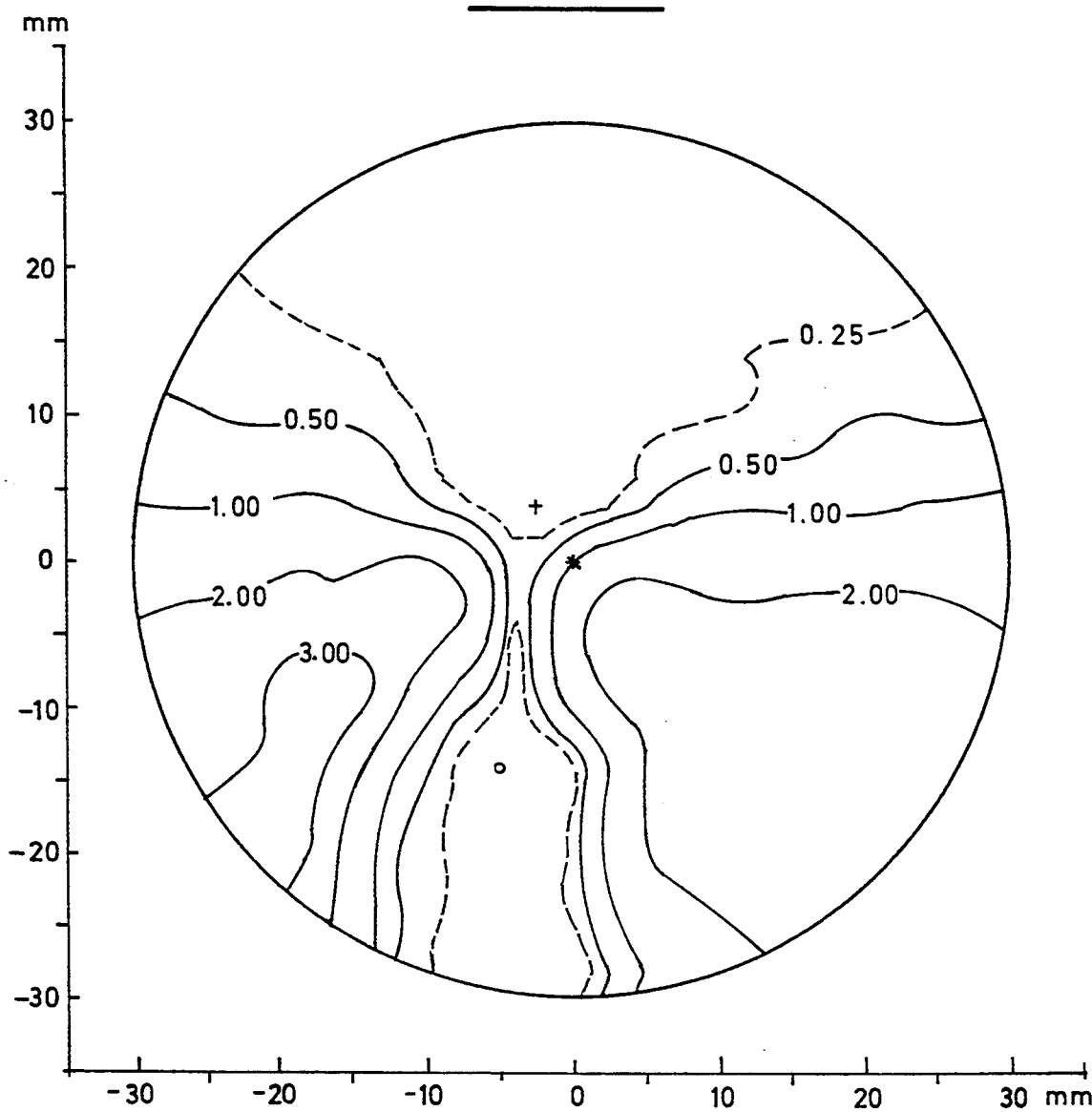

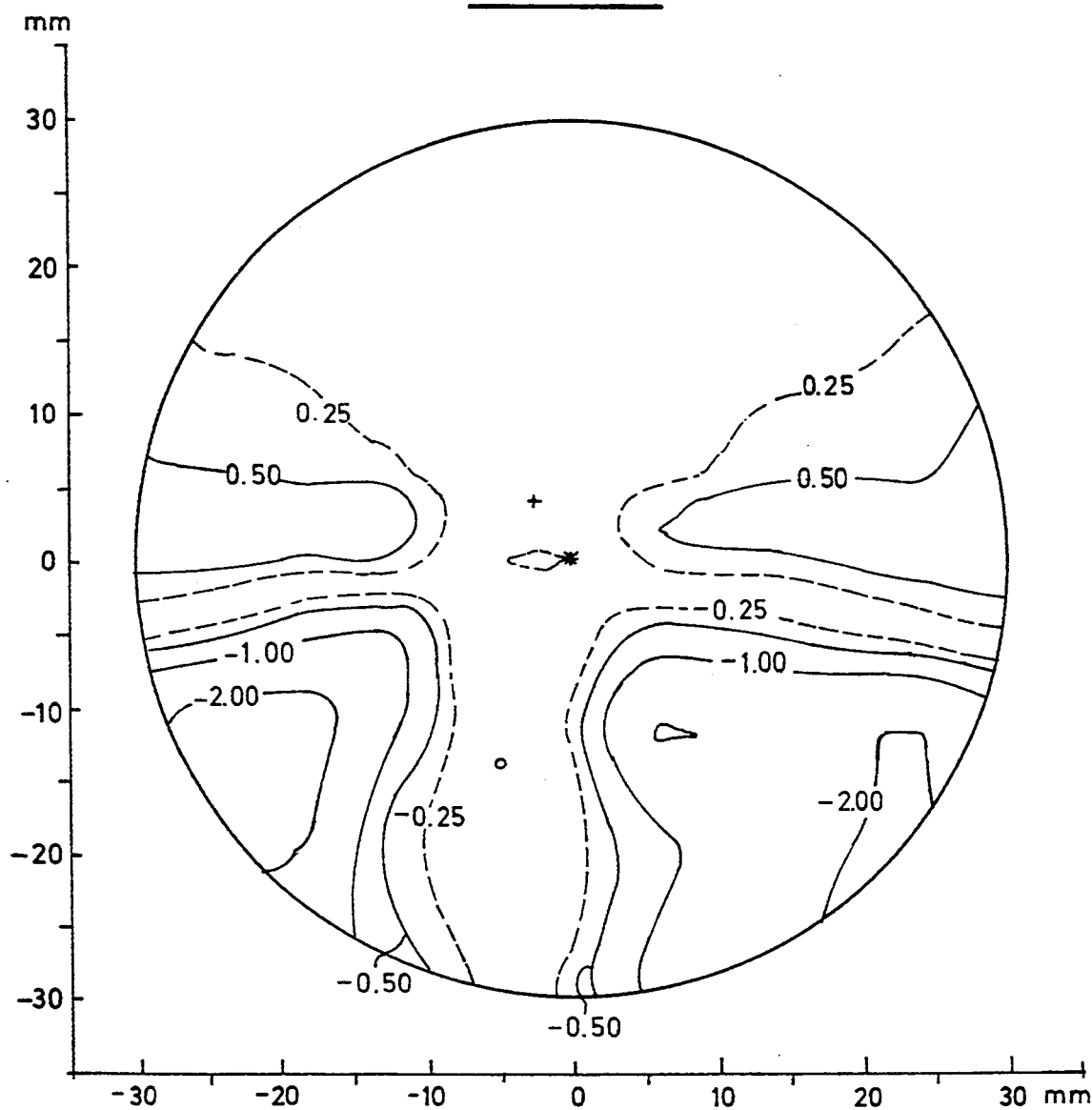

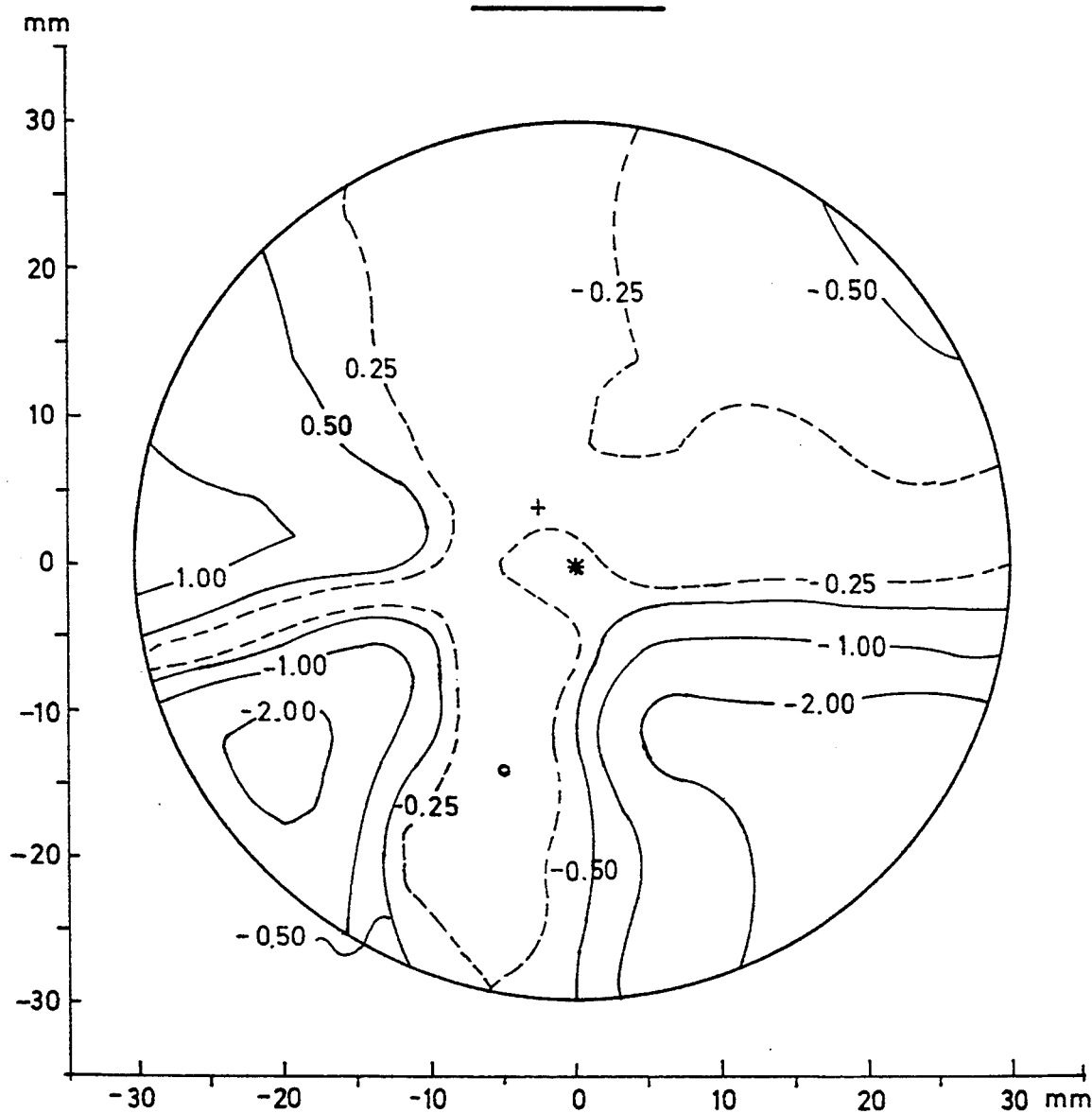

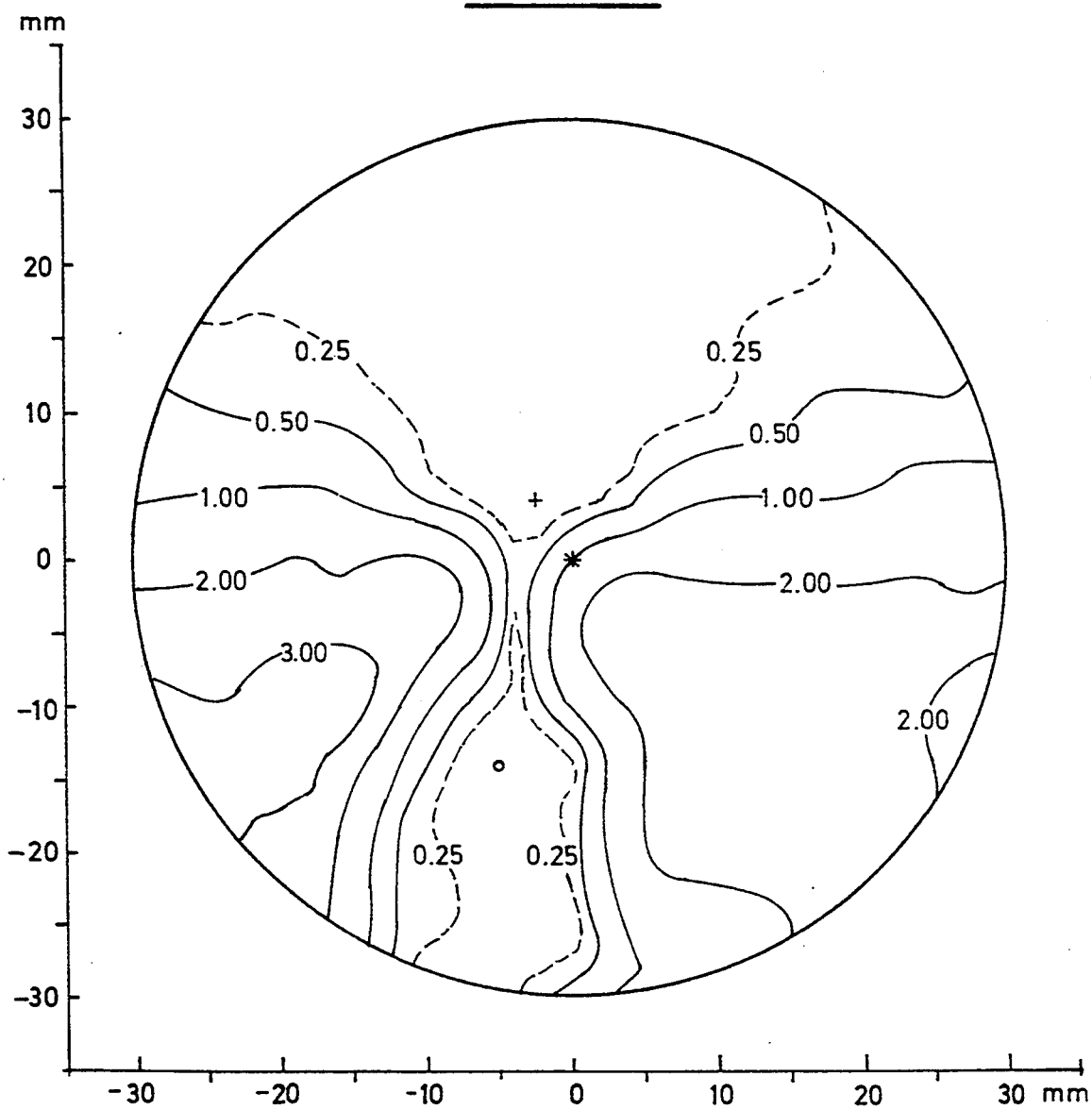

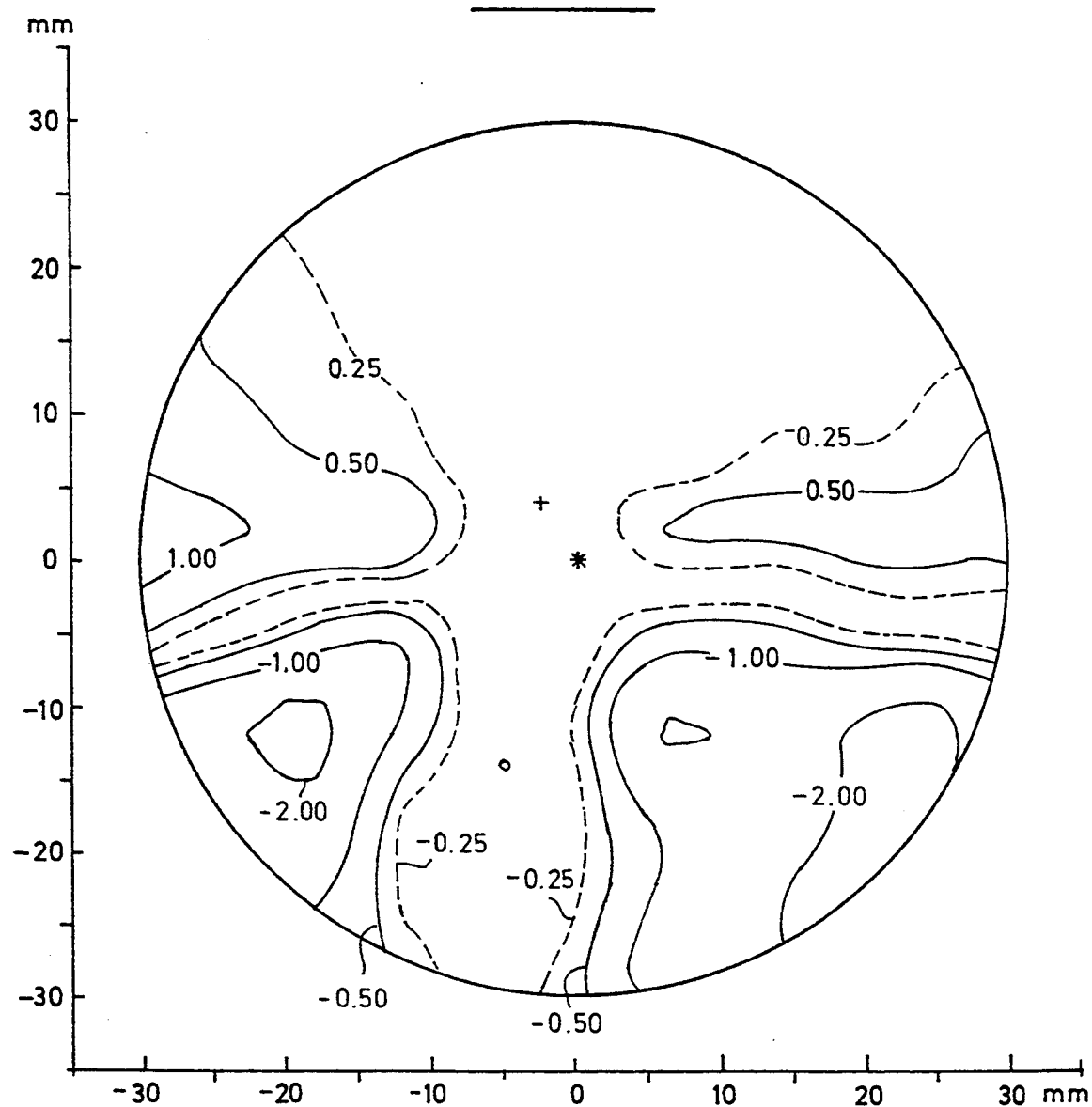

SPECTACLE LENS

FIELD OF THE INVENTION

The invention relates to a spectacle lens having a prescription surface and a multifocal surface.

BACKGROUND OF THE INVENTION

Spectacle lenses are grouped as those having one refractive power and those having several refractive powers but at least two different refractive powers. The different refractive powers of the last-mentioned spectacle lenses enable the viewer to see without difficulty in at least the near and far ranges.

The multifocal surface of these spectacle lenses is the surface which generates different refractive powers in different zones of the lens and thereby makes viewing possible without difficulty for the far and near ranges and possibly also for intermediate ranges. The multifocal surface can be configured as a bifocal surface, trifocal surface or a multifocal surface.

The prescription surface is the opposite-lying surface adapted to this multifocal surface so that the spectacle lens has the required dioptric powers at the reference points. Dioptric power is the generic term for spherical, astigmatic and prismatic action for a specific ray direction at a specific point in the spectacle lens (especially the reference point for the far-vision zone or the reference point for the near-vision zone).

Spectacle lenses exemplary of the foregoing are the multifocal lenses disclosed in U.S. Pat. Nos. 4,606,622 and 5,137,343 and German Patent 2,044,639. Additional multifocal lenses are described in the article of G. Guilino et al entitled "Neue progressive Flächen" published in the journal DOZ, Number 11, Nov. 20, 1980, pages 20 to 23.

The suitability of a spectacle lens for a specific spectacles wearer is dependent upon the individual use situation. This use situation arises from the individual use requirements which include dioptric power, corneal vertex distance, object distances, forward inclination of the spectacle frame et cetera.

British Patent 1,239,620 discloses an ophthalmic lens having a greater refractive power and pregiven astigmatic effect for a first surface which is spherical or toric and which has a second surface which is corrected with reference to field curvature and deviations of the astigmatism from the constant. It is not possible with this lens to additionally consider individual use requirements because of the symmetry requirements and because the necessary degrees of freedom are no longer available.

The finished spectacle lens is produced in a manufacturing process by applying a spherical or toric prescription surface to the so-called semi-finished piece which already has a multifocal surface. The prescription surface is necessary for the required dioptric power. This multifocal surface is so conceived that the imaging errors for the wearer of the spectacles correspond to the desired "design" over the entire lens for a specific average use situation in combination with a spherical or toric prescription surface corresponding to this use situation. The distribution of the average power and of the astigmatic deviation and/or of the horizontal or vertical prismatic action and/or the distortion is characterized as the "design" of the multifocal surface. These distributions in the average use situation are characterized in the following as the optimized basic case.

For reasons of cost, this semi-finished piece is utilized for a wide range of use situations. An individual spherical or toric prescription surface is applied to the semi-finished piece in order to obtain the dioptric power for the particular spectacles wearer. In this way, the usable zones for viewing far and for viewing near and for viewing at intermediate distances are limited.

SUMMARY OF THE INVENTION

It is an object of the invention to provide a spectacle lens which does not have the above limitations but yet is made by using a semi-finished piece having the prefinished multifocal surface.

The spectacle lens of the invention is subject to use conditions particular to an individual for whom the spectacle lens is intended and these use conditions include dioptric power. The spectacle lens includes: a lens body defining a multifocal surface and a prescription surface; the lens body having a far reference point and a near reference point and having pregiven dioptric powers achieved in the far and near reference points, respectively; the prescription surface being a generally aspheric surface without point and axis symmetry; and, the prescription surface having a geometry determined by considering from the individual use conditions at least the dioptric power in an area.

With the spectacle lens of the invention, all wearers of spectacles can be provided with optimally corrected lenses which is in contrast to the state of the art. With these lenses, the adaptation to the individual use situation of the particular spectacles wearer takes place within an area in lieu of only at the far and near reference points as previously.

According to a feature of the invention, the prescription surface is, after machining, a generally aspherical surface and therefore departs significantly from the spherical and toric prescription surfaces previously known. The prescription surface configured in this manner is not a multifocal surface since the intended increase of the refractive power for the near zone is already generated by the multifocal surface available on the semi-finished piece. The prescription surface acts exclusively to provide the dioptric power at the reference points and acts to eliminate increases in imaging errors.

These increases in imaging errors occur because an average use situation is the basis for the determination of the multifocal surface. This use situation generally departs more or less from the individual use situations which occur later. The distribution of the mean power and the astigmatic deviation and/or the horizontal or vertical prismatic action and/or the distortion are characterized as the "design" of the multifocal surface. These distributions in the average use situation are characterized in the following as the optimized basic case. The imaging error distribution in the average use situation for the determination of the multifocal surface is described in the following as the optimized basic case.

For determining the prescription surface, the following individual use conditions, individually or in combination, in addition to the dioptric power can form the basis of the computation:

(1) Corneal vertex distance.
(2) Distances to the object.
(3) Forward inclination of the spectacles frame.

(4) Shape of the frame: if the form of the frame and centering are known, then the required prismatic actions can be distributed to the right and left lens so that favorable thickness and weight relationships are provided. The optimization can be carried out for these determined thicknesses. Furthermore, and for a known shape of the spectacles frame, a special optimal distribution of the imaging errors can be obtained with the errors being shifted into the portions to be cut away.

(5) Depth of curvature: spectacle lenses made from semi-finished pieces having unusual depth of curvature can be optimized, for example, with respect to anisometropias for adapting the appearance or for aniseikonias.

(6) Slightly different refraction values for axis and cylinder in the far zone and near zone of a multifocal lens.

The new spectacle lenses are characterized in that the imaging quality of the lenses is maintained even for extreme deviations of the actual use situations from the average use situations (that is, minimum imaging errors occur) without the necessity of providing an individual multifocal surface for each individual user. The corrections to the prescription surface which are necessary for this purpose can be realized with numerically controlled machines. The complexity and the cost therefor is less than when the multifocal surfaces would be newly computed and separately manufactured.

Furthermore, the area of application of a semi-finished piece can be significantly increased with the aid of the invention; for example, a semi-finished piece having unusual depth of curvature can be used for a specific use situation (for aniseikonia and for curvature adaptation in the case of intense anisometropia).

A rear surface according to the invention can be computed for the individual use situation for each semi-finished piece with the rear surface generating an imaging error distribution which corresponds to the optimized basic case.

BRIEF DESCRIPTION OF THE DRAWINGS

The invention will now be described with reference to the drawings wherein:

FIG. 1 shows the elevations of the forward surface of a multifocal spectacle lens which form the basis of the computations for FIGS. 3a to 5c;

FIG. 3b shows the spherical deviation of the optimized basic case of FIG. 3a;

FIG. 4b shows the spherical deviation for the spectacle lens according to FIG. 4a;

FIG. 5a is an elevation representation which shows the deviations of a rearward surface according to the invention from the toric rearward surface of FIG. 4;

FIG. 5b shows the astigmatic deviation for the spectacle lens having the forward surface of FIG. 1 and the rearward surface of FIG. 5a;

FIG. 5c shows the spherical deviation for the spectacle lens of FIG. 5a;

FIG. 6 is an elevation representation of the forward surface of a multifocal spectacle lens which forms the basis of the computations for FIGS. 7a to 9c;

FIG. 7a shows the astigmatic deviation of a spectacle lens (sphere 0.0 dpt and near addition 2.5 dpt) having the forward surface of FIG. 6 and a spherical rearward surface for a second embodiment of the optimized basic case;

FIG. 7b shows the spherical deviation of the spectacle lens of FIG. 7a;

FIG. 8b shows the spherical deviation of the spectacle lens of FIG. 8a;

FIG. 9a is an elevation representation which shows the deviation of a rearward surface of the invention from the spherical rearward surface of FIGS. 8a and 8b;

FIG. 9b shows the astigmatic deviation of the spectacle lens having the forward surface of FIG. 6 and the rearward surface of FIG. 9a; and, FIG. 9c shows the spherical deviation of the spectacle lens of FIG. 9b.

DESCRIPTION OF THE PREFERRED EMBODIMENTS OF THE INVENTION

In both of the following examples, the multifocal surface is the surface (forward surface) facing toward the object and the prescription surface is the surface (rearward surface) facing toward the eye. For these examples, the spherical and the astigmatic deviations in dpt are seen as the significant imaging errors. All other numerical data are in mm.

These imaging errors are defined as delineated below. For the spectacles wearer, a dioptric power for the spectacle lens is provided when looking therethrough which is dependent upon the particular viewing point. This corresponds generally only at the reference point to the refractive values. The difference of the mean power (sph+cyl/2) in the viewing point to the corresponding desired value from the refraction is defined in the following as the spherical deviation. The difference of the astigmatic effect in the viewing point to the corresponding desired value from the refraction while considering the axis position is referred to in the following as the astigmatic deviation.

All lenses of the two examples have the refractive index of 1.604 and a thickness reduction prism of 1.50 cm/m having basis 270° in addition to the particular prescription prism.

Figure 1:
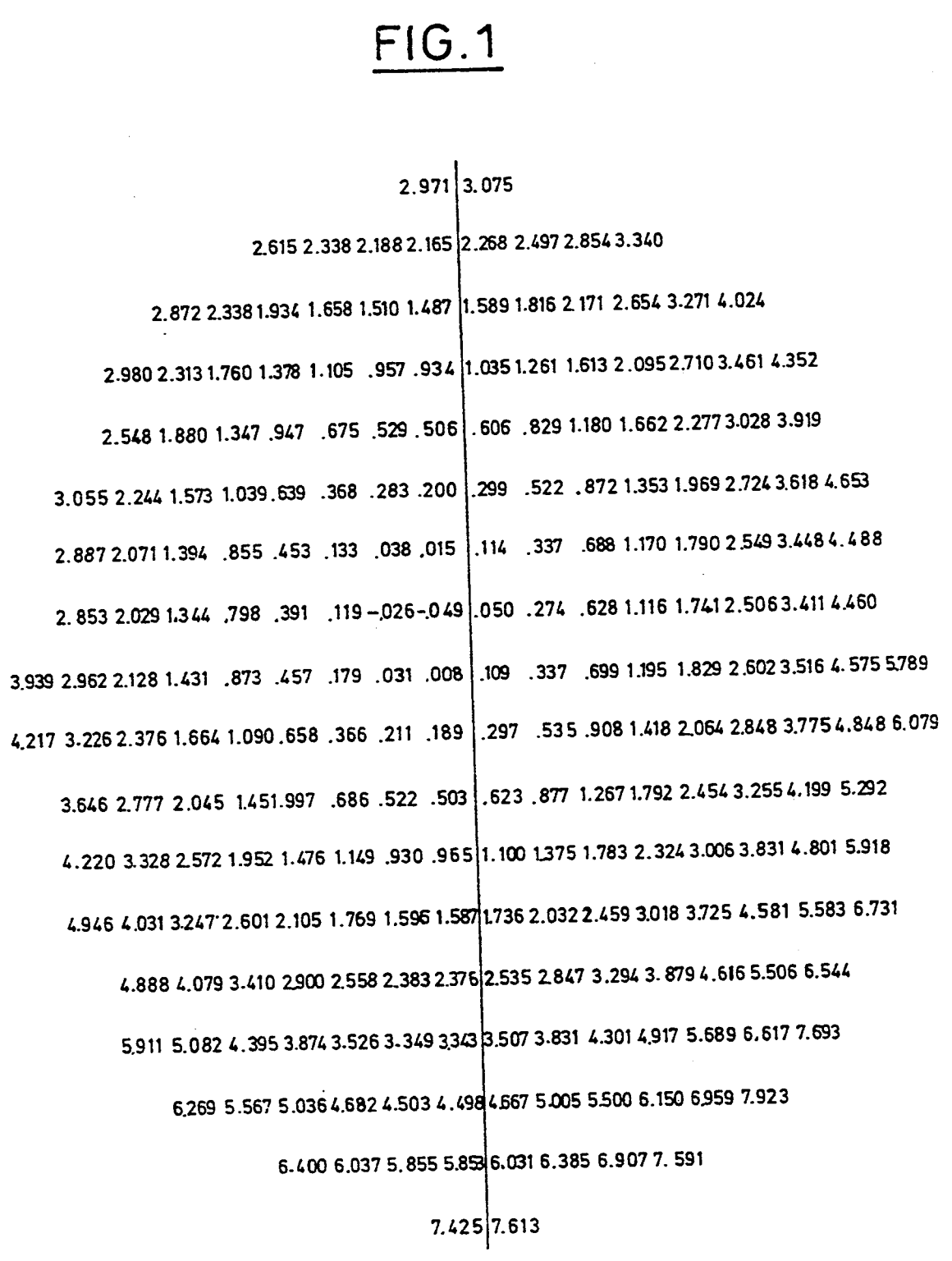

The elevation representation of the multifocal forward surface is given in FIG. 1 and is used in the first example of FIG. 3a to FIG. 5c. The point spacing in this elevation table (as well as in all following elevation tables) amounts to 3.0 mm and the lens diameter to 51.00 mm.

Figure 2:
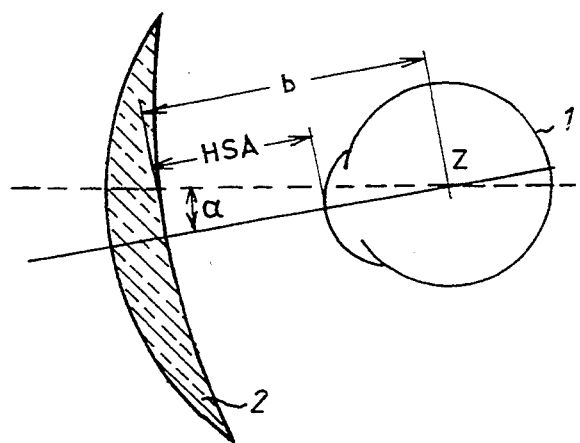
FIG. 2 is a vertical section view of an eye and a spectacle lens coacting therewith.

In FIG. 2, a schematically represented eye 1 has an optical rotation point identified by Z. FIG. 2 shows a side view of the system of a spectacle lens 2 and an eye 1 for an inclination of the plane of the frame by the angle α. The cornea-vertex distance (the distance between corneal vertex and vertex of the rearward lens surface) is identified by HSA and the distance between the rotation point Z and the vertex of the rearward lens surface lying on the path inclined at an angle α with respect to the horizontal is identified by (b). The above-mentioned rotation point Z is a point in the interior of the eye which maintains its position during viewing movements of the eye.

Figure 3A:
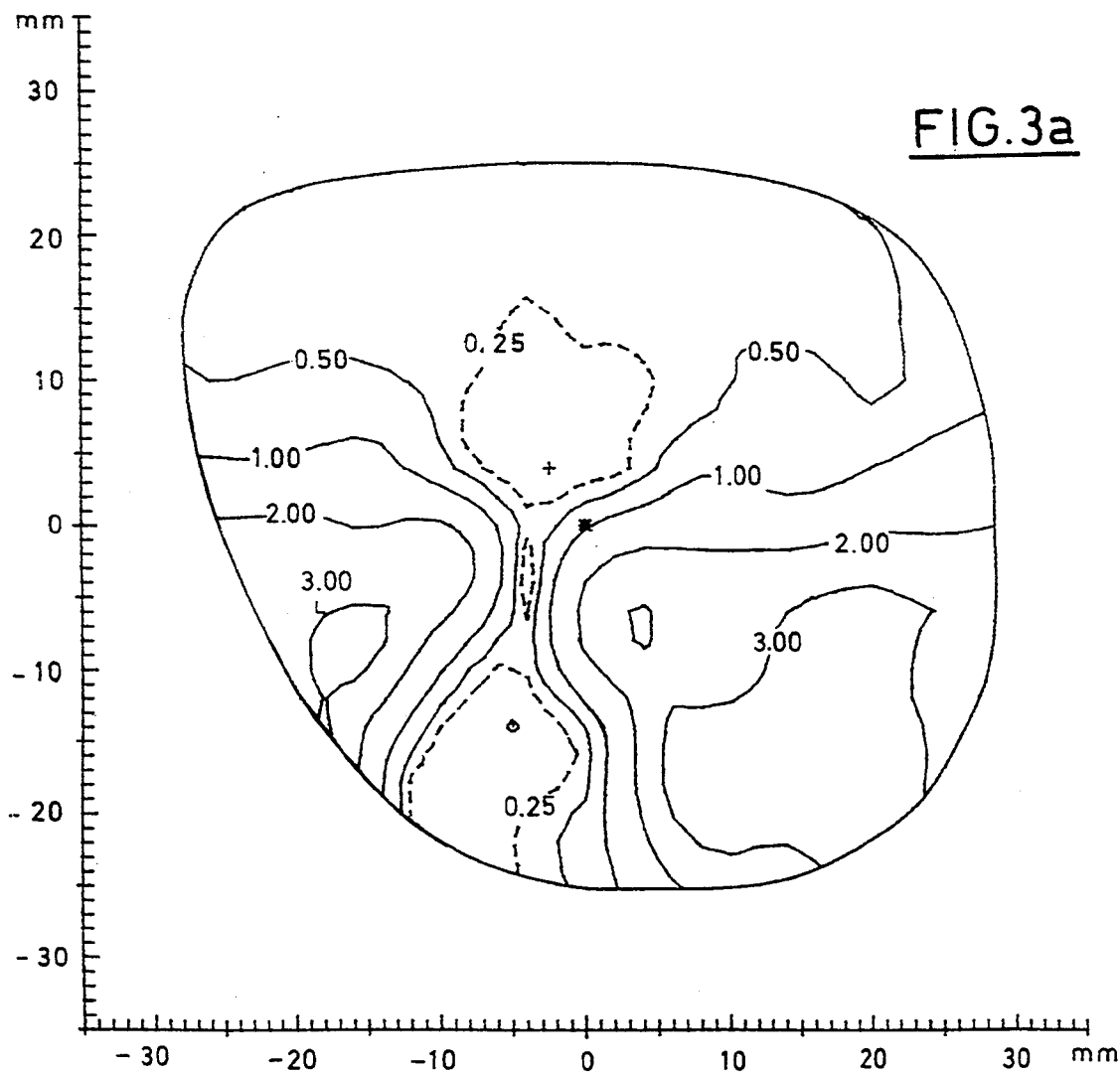
FIG. 3a shows the astigmatic deviation of an optimized basic case (sphere 5.00 dpt and near addition 2.5 dpt) having the forward surface of FIG. 1 and a spherical rearward surface pursuant to a first embodiment.
Figure 3B:
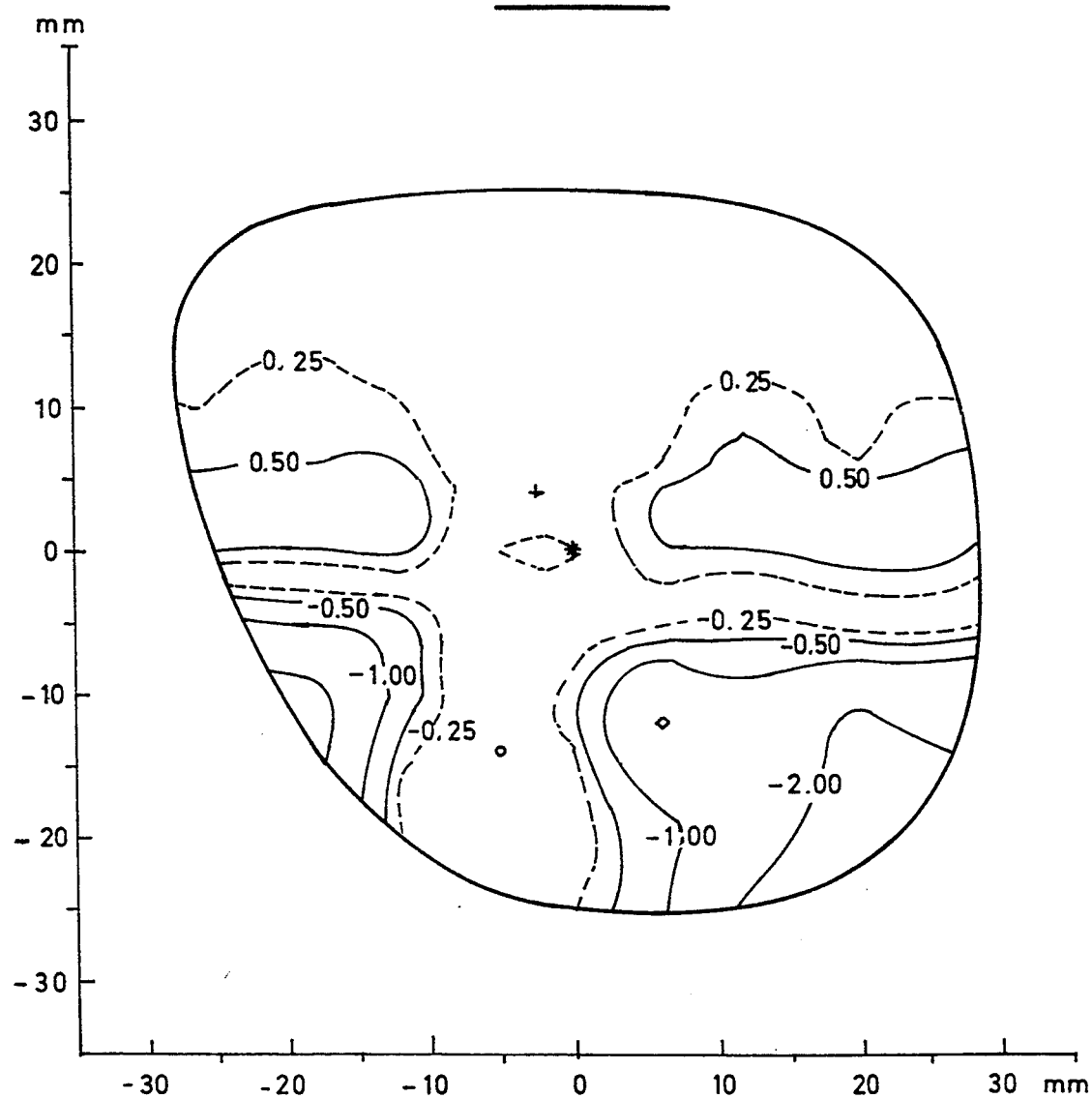

The astigmatic deviation is shown in FIG. 3a and the spherical deviation is shown in FIG. 3b for a spectacle lens having the multifocal surface of FIG. 1, spherical prescription surface and the use situation:

sph 5.00 dpt, cyl 0.00 dpt, near addition 2.50 dpt, prescription prism 0.00 cm/m;
HSA 15.0 mm;
object distance 33 cm in the near zone and infinity in the far zone;
forward inclination 9°.

The center thickness of the lens is 6.4 mm and the radius of the spherical prescription surface is 172.57 mm. The multifocal surface of the spectacle lens is precisely optimized with this prescription surface and for this use situation so that FIGS. 3a and 3b represent the optimized basic case with respect to the spherical and astigmatic deviation for the first example.

If a semi-finished piece having this multifocal surface is now used for the changed use situation:

sph 2.00 dpt, cyl 4.00 dpt, axis 60°, near addition 2.50 dpt, prism 2.00 cm/m having basis 270°;
HSA 15.0 mm;
object distances 33 cm in the near zone and infinity in the far zone;
forward inclination 9°, then a toric prescription surface would be needed according to the state of the art having the radii in the two main sections of 230.10 mm and 91.17 mm. The center thickness for this lens is 8.0 mm.

Figure 4A:
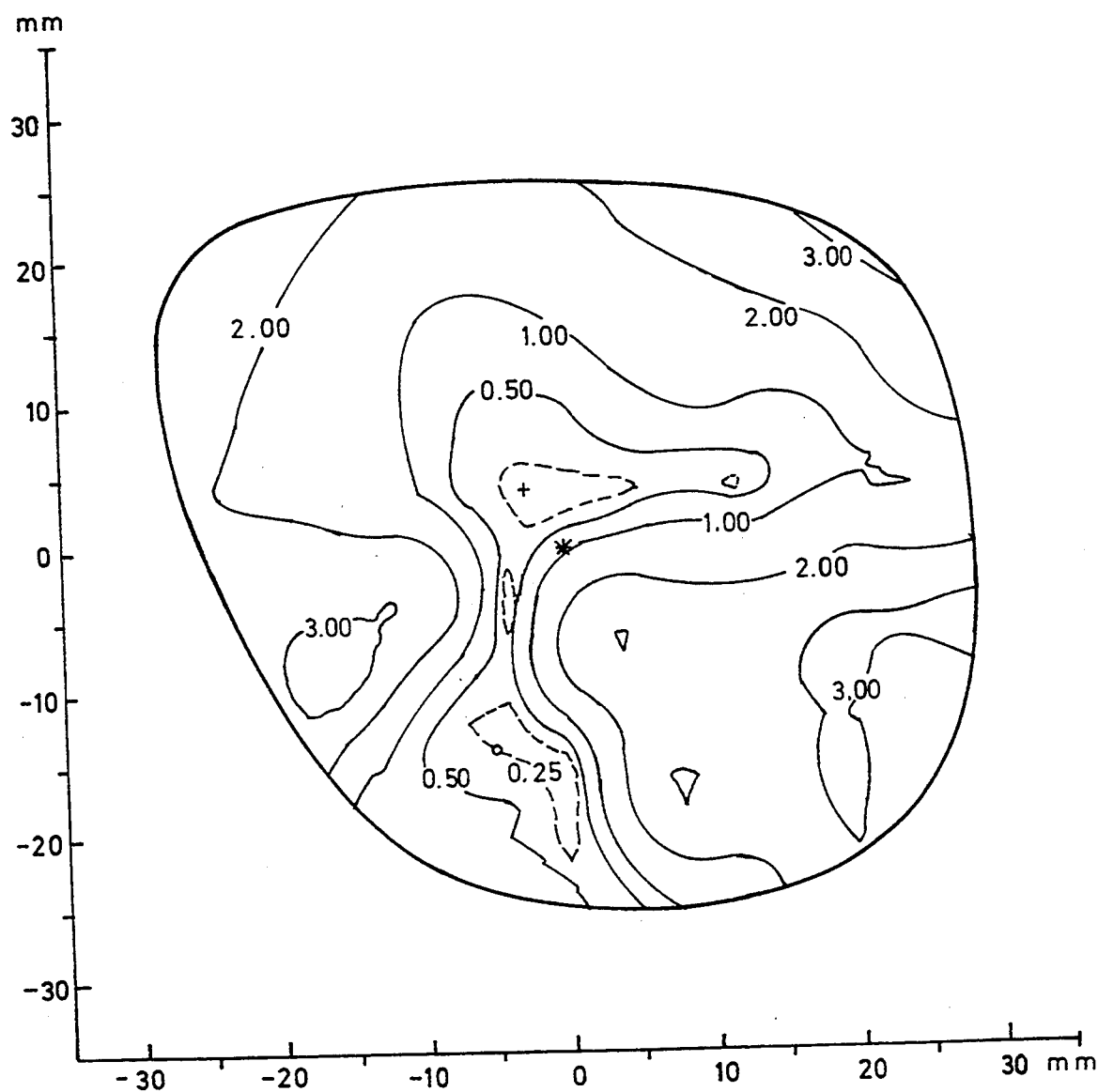
FIG. 4a shows the astigmatic deviation for a spectacle lens having the forward surface of FIG. 1 and a toric rearward surface for sphere 2.00 dpt, cylinder 4.00 dpt for axis 60° and a prescription prism 2.00 cm/m having basis 270° according to the state of the art.
Figure 4B:
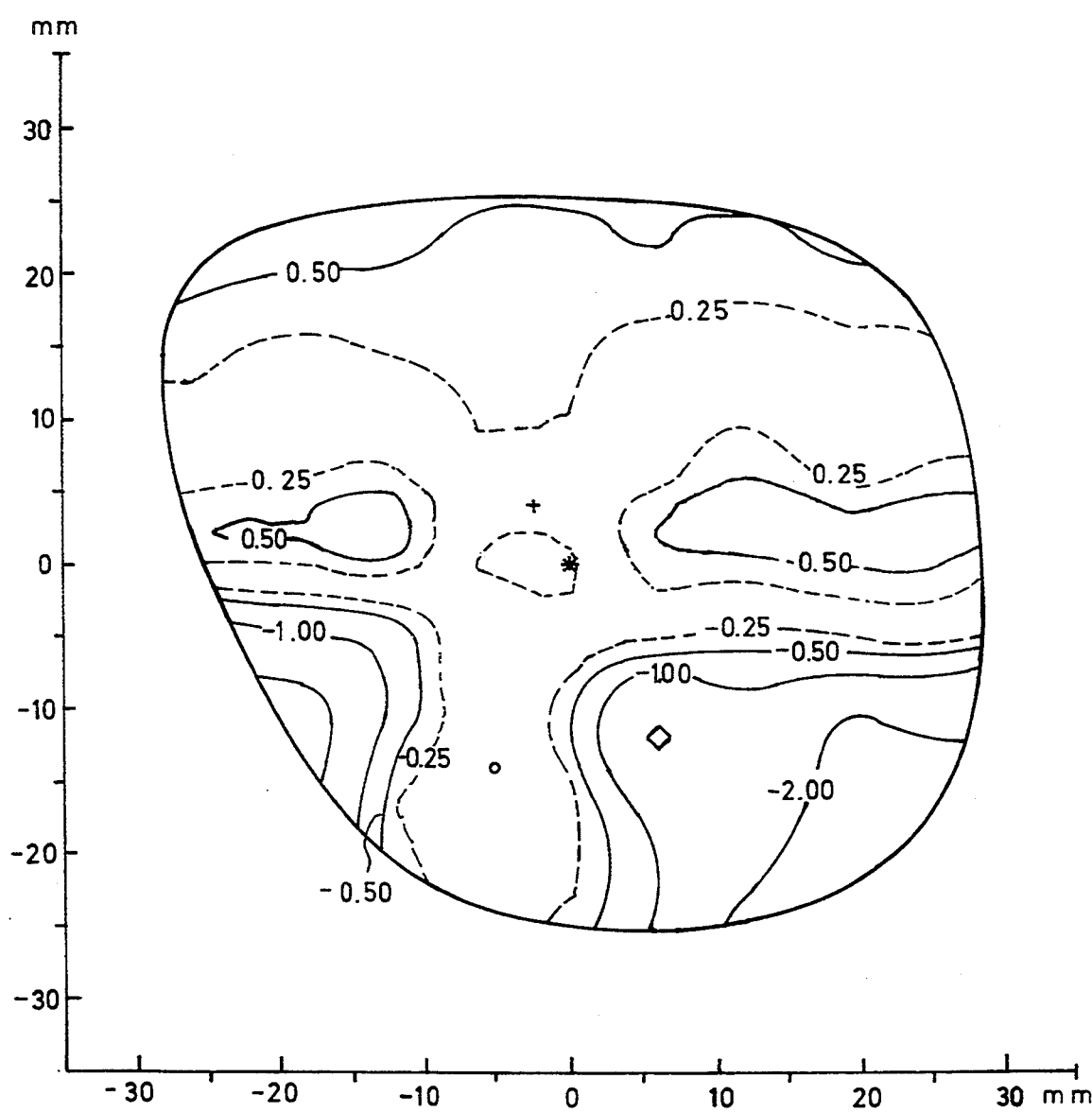
Figure 5B:
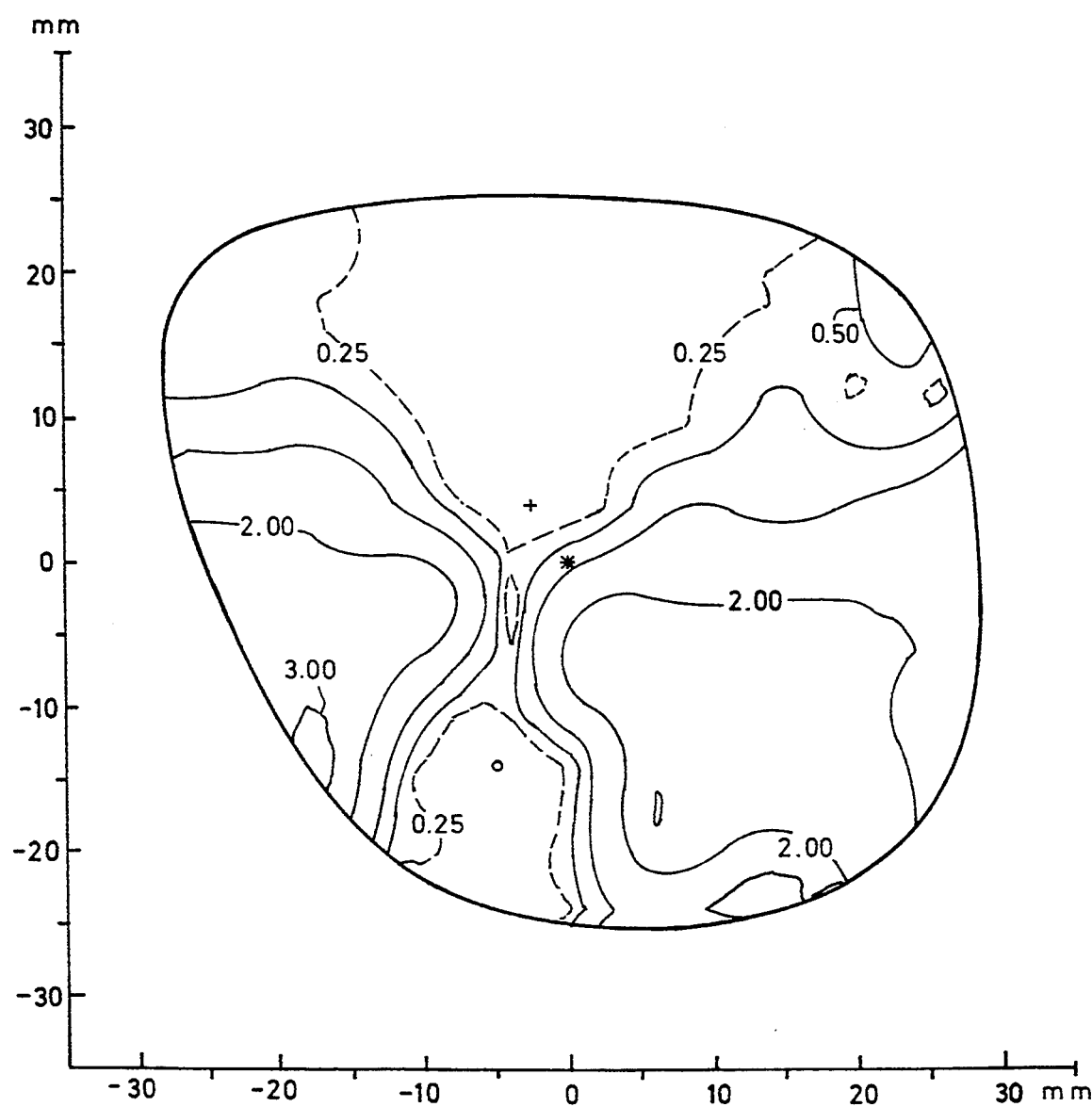
Figure 5C:
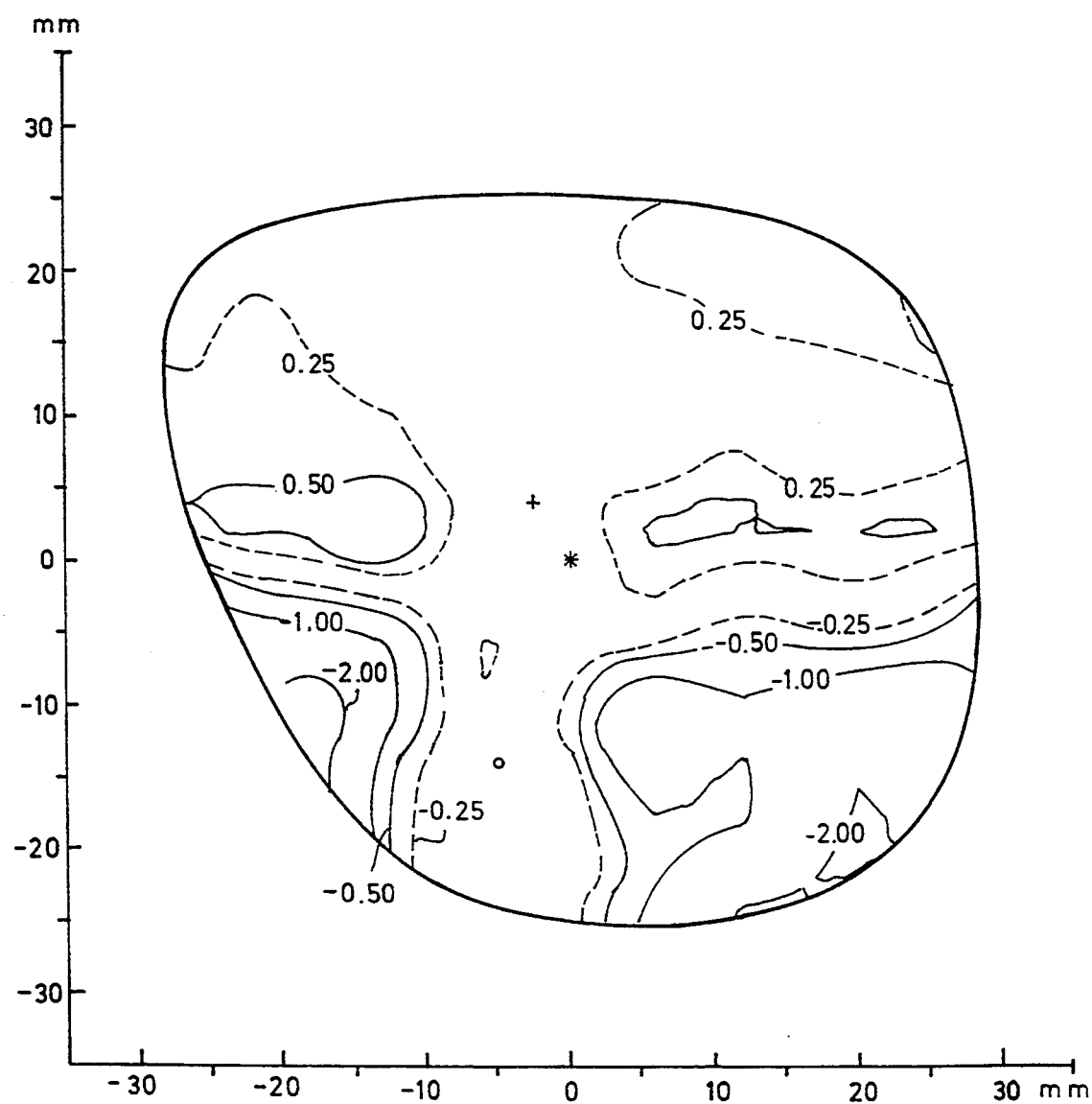

FIGS. 4a and 4b show the astigmatic and the spherical deviation of this spectacle lens for this use situation. It can be clearly seen that a considerable deviation of the line trace and therefore considerably higher imaging errors result outside of the reference points for the spectacles wearer compared to the optimized basic case. For example, the region on the spectacle lens is considerably reduced for which the spectacles wearer must accept an astigmatic deviation of at most 0.5 dpt (FIG. 4a) compared to the optimized basic case (FIG. 3a).

A change according to the invention of the toric prescription surface of this spectacle lens leads to the elevation deviations (shown in FIG. 5a) of the new aspheric prescription surface which is in contrast to the original toric prescription surface. The spectacle lens having the prescription surface deformed in this manner has the imaging errors shown in FIGS. 5b and 5c for the spectacles wearer in the above-mentioned use situation. The astigmatic deviation (FIG. 5b) and the spherical deviation (FIG. 5c) correspond in magnitude and distribution to those of the optimized basic case (FIG. 3a and FIG. 3b); that is, quality and design of the multifocal surface optimized originally for another use situation are fully retained for a lens having a prescription surface deformed in the above manner.

The geometry of the prescription surface configured according to the invention results from the computation of the imaging errors across the entire lens and the suitable variation of a smooth parametricized surface; that is, a spline surface with the aid of known mathematical optimized algorithms.

An elevation table of the multifocal forward surface is provided in FIG. 6 and is used in the following second example shown in FIGS. 7a to 9c. For a spectacle lens having the following: this multifocal forward surface, a spherical prescription surface and the use situation:

sph 0.00 dpt, cyl 0.00 dpt, near addition 2.50 dpt;
prescription prism 0.00 dpt;
HSA 15.0 mm;
object distances 33 cm in the near zone and infinite in the far zone;
forward inclination 9°, FIG. 7a shows the astigmatic deviation and FIG. 7b shows the spherical deviation. The center thickness is 2.0 mm and the radius of the spherical prescription surface is 115.05 mm.

FIGS. 7a and 7b therefore show the optimized basic case with reference to astigmatic and spherical deviation of the second example.

Figure 8A:
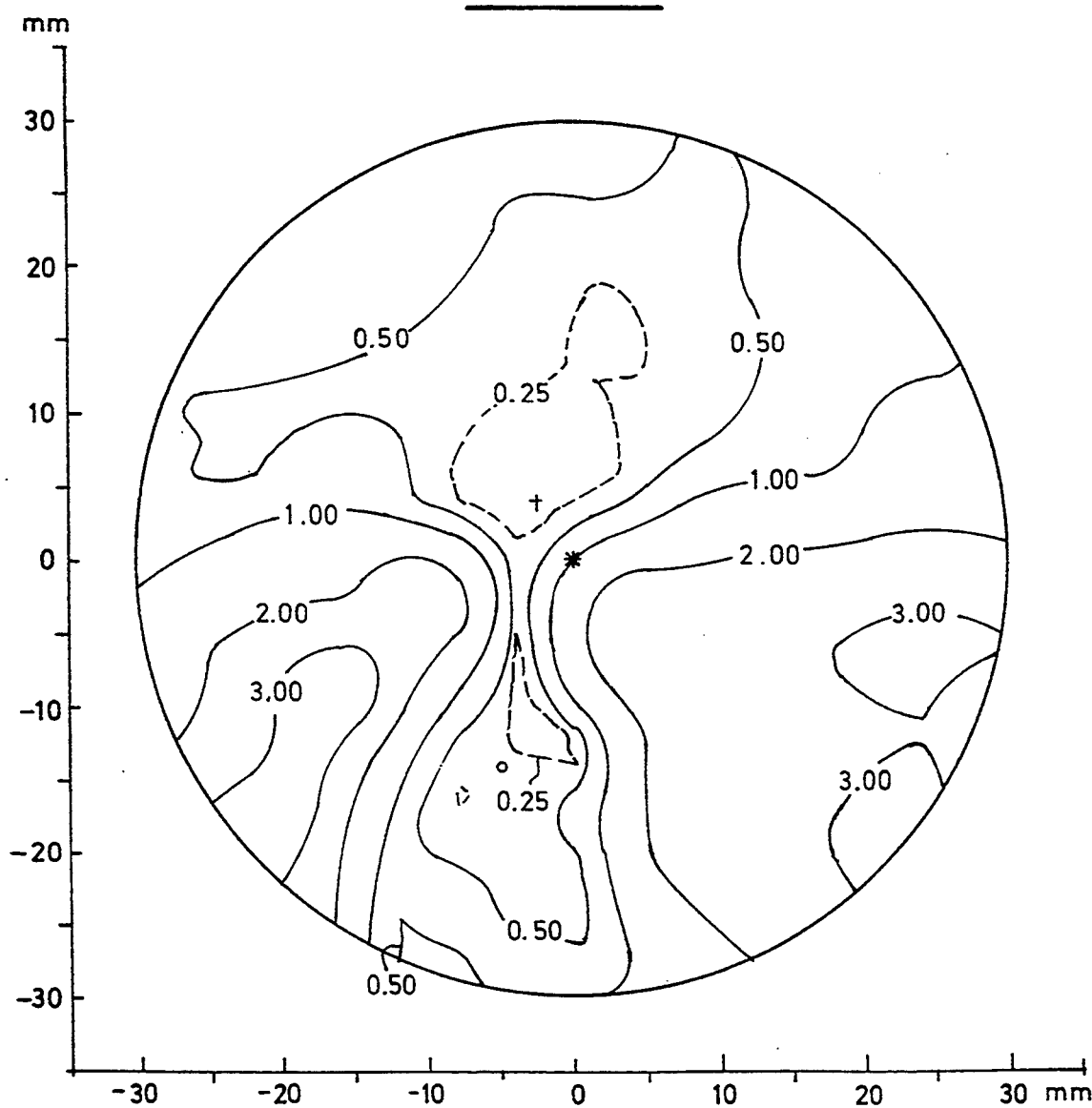
FIG. 8a shows the astigmatic deviation for a spectacle lens having the forward surface of FIG. 6 and a spherical rear surface for sphere 0.00 dpt and a prescription prism 6.00 cm/m having basis 0° according to the state of the art.

If the use situation is now changed with respect to the prism as follows:

prescription prism 6.00 cm/m having basis 0°, then the imaging errors result in spherical and astigmatic deviations according to FIGS. 8a and 8b. The center thickness for this lens is then 4.4 mm and the spherical prescription surface has the radius 112.37 mm. A significant increase of both imaging errors can be seen relative to the optimized basic case even though only a conventional prescription prism has been used for this example.

In FIG. 9a, the deviations in the elevation of the prescription surface of the invention to the spherical prescription surface of the spectacle lens of FIGS. 8a and 8b are provided in the table.

The astigmatic and the spherical deviation of the spectacle lens having a prescription surface so modified is shown in FIGS. 9b and 9c. As in the first example, a significant improvement of the imaging quality for the spectacle wearer is provided. The imaging quality corresponds, in turn, to the optimized basic case.

It is understood that the foregoing description is that of the preferred embodiments of the invention and that various changes and modifications may be made thereto without departing from the spirit and scope of the invention as defined in the appended claims.

What is claimed is:

1. A spectacle lens subject to use conditions particular to an individual for whom the spectacle lens is intended, said use conditions including dioptric power and said spectacle lens comprising:

a lens body having first and second surfaces;
said first surface being a multifocal surface and said second surface being a nonsymmetrical prescription surface;
said lens body having a far reference point and a near reference point and having pregiven dioptric powers achieved in said far and near reference points, respectively;
said nonsymmetrical prescription surface being a generally aspheric surface without point and axis symmetry; and,
said nonsymmetrical prescription surface having a geometry determined by considering from said individual use conditions at least the dioptric power in a plurality of specific elemental areas of said nonsymmetrical prescription surface in addition to said reference points to correct imaging errors of said lens particular to said individual.

2. The spectacle lens of claim 1, wherein said prescription surface has a geometry determined by considering additionally the corneal vertex distance in an area.

3. The spectacle lens of claim 1, wherein said prescription surface has a geometry determined by considering additionally the object distance in an area.

4. The spectacle lens of claim 1, wherein said prescription surface has a geometry determined by considering additionally the inclination of the spectacle frame holding said spectacle lens in an area.

5. The spectacle lens of claim 1, wherein said prescription surface has a geometry determined by considering additionally the shape of the spectacle frame holding said spectacle lens in an area.

6. The spectacle lens of claim 1, wherein said geometrical determination in an area is extended to cover the entire prescription surface.

7. The spectacle lens of claim 1, wherein said multifocal surface is a progressive surface.

8. The spectacle lens of claim 2, wherein said geometrical determination in an area is extended to cover the entire prescription surface.

9. The spectacle lens of claim 3, wherein said geometrical determination in an area is extended to cover the entire prescription surface.

10. The spectacle lens of claim 4, wherein said geometrical determination in an area is extended to cover the entire prescription surface.

11. The spectacle lens of claim 5, wherein said geometrical determination in an area is extended to cover the entire prescription surface.

12. The spectacle lens of claim 8, wherein said multifocal surface is a progressive surface.

13. The spectacle lens of claim 9, wherein said multifocal surface is a progressive surface.

14. The spectacle lens of claim 10, wherein said multifocal surface is a progressive surface.

15. The spectacle lens of claim 11, wherein said multifocal surface is a progressive surface.

16. The spectacle lens of claim 1, said first surface being the forward surface of said lens and said second surface being the rearward surface of said lens.

17. A spectacle lens subject to use conditions particular to an individual for whom the spectacle lens is intended, said use conditions including dioptric power and said spectacle lens comprising:

a lens body having first and second surfaces;

said first surface being a multifocal surface and said second surface being a nonsymmetrical prescription surface;

said lens body having a far reference point and a near reference point on said multifocal surface and having pregiven dioptric powers achieved in said far and near reference points, respectively;

said nonsymmetrical prescription surface being a generally aspheric surface without point and axis symmetry; and, said nonsymmetrical prescription surface having a geometry determined from said individual use conditions to provide said pregiven dioptric powers at said reference points to eliminate increases in imaging errors as well as to provide appropriate dioptric powers at specific points on said nonsymmetrical prescription surface as required for said individual.

18. The spectacle lens of claim 17, said first surface being the forward surface of said lens and said second surface being the rearward surface of said lens.

19. A spectacle lens subject to use conditions particular to an individual for whom the spectacle lens is intended, said use conditions including dioptric power and said spectacle lens comprising:

a lens body having first and second surfaces;

said first surface being a multifocal surface and said second surface being a nonsymmetrical prescription surface;

said lens body having a far reference point and a near reference point on said multifocal surface and having pregiven dioptric powers achieved in said far and near reference points, respectively;

said nonsymmetrical prescription surface being a generally aspheric surface without point and axis symmetry; and, said nonsymmetrical prescription surface having a geometry determined by considering from said individual use conditions at least the dioptric power in a plurality of specific elemental areas of said nonsymmetrical prescription surface in addition to said reference points to correct imaging errors of said lens particular to said individual and wherein said individual use conditions, individually or in combination, include: the corneal vertex distance in an area; distance to an object in an area; forward inclination of the spectacles frame; shape of the spectacles frame; and, depth of curvature of the lens body.

20. The spectacle lens of claim 19, said first surface being the forward surface of said lens and said second surface being the rearward surface of said lens.

* * * * *